UNIFORM MIXTURES OF QUATERNARY AMMONIUM SALT ISOMERS

Walter P. Barie, Jr., Shaler Township, Allegheny County, Norman W. Franke, Penn Hills Township, Allegheny County, and Stanley C. Paviak, Shaler Township, Allegheny County, Pa., assignors to Gulf Research & Development Company, Pittsburgh, Pa.

No Drawing. Continuation-in-part of application Ser. No. 787,241, Dec. 26, 1968, now Patent No. 3,591,563. This application Nov. 6, 1970, Ser. No. 87,650
Int. Cl. C07c 87/04
U.S. Cl. 260—343.7         2 Claims

ABSTRACT OF THE DISCLOSURE

Isomeric quaternary ammonium salt mixtures of the various individual compounds represented by the following formula:

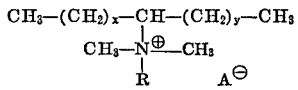

wherein the total number of carbon atoms in the linear paraffin chain is from about 8 to about 22; wherein $x$ is a whole number from about 0 to 19 and $y$ is a whole number from about 0 to 19; wherein R is lower alkyl, lower alkenyl, cycloalkyl, heterocyclic, or aryl, and A is an anion of an acid. These compounds are mixtures of substantially equal amounts of the various monoamine isomers wherein the monoamine is attached to different internal carbon atoms. The compounds are used as effective antistatic agents for plastics and as germicides.

---

This application is a continuation-in-part of our copending application, U.S. Ser. No. 787,241, filed Dec. 26, 1968, now U.S. Pat. No. 3,591,563.

This invention relates to novel isomers of quaternary ammonium salts useful as antistatic agents for plastic compositions and as germicides. More particularly, this invention relates to the use of the novel isomeric mixtures as antistatic agents for plastics to suppress electrostatic charges thereon.

Many plastic products especially those of the synthetic resin class, have a tendency to develop electrostatic charges during their formation. The occurrence of these electrostatic charges in plastic products presents a very real problem. Not only do these charges attract dirt and dust to the product, but they tend to cause the product to cling to the processing equipment during manufacture. This clinging often causes shut-down of the machinery as well as weakening of the final product formed. In addition, many products have a tendency to give off annoying shocks and, in certain instances, dangerous sparks.

In order to avert the above problems, the art has proposed many methods of suppressing electrostatic charges in synthetic resins and fibers. For example, external methods such as humidity control as well as liquid surface treatment give temporary relief from the above problems. In addition, the art has developed numerous agents, known as internal antistatic agents, which when incorporated within the plastic product rather than just on its surface, reduce the above problems by suppressing the electrostatic charges therein. Internally incorporated antistatic agents are generally preferred over the external agents since the suppressing effects thereof are usually longer lasting.

It is the purpose of this invention to provide the art with various antistatic agents which when used either externally as a surface agent or internally in a plastic, serve to reduce or substantially eliminate the problems heretofore described. In many instances, the anti-static properties of the agents of this invention are superior to those of antistatic agents heretofore used.

Basically, the compounds of this invention may be referred to as isomeric quaternary ammonium salt mixtures. More particularly, they are isomeric mixtures of the various individual compounds represented by the formula:

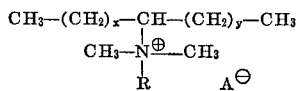

wherein the total number of carbon atoms in the linear paraffins chain is from about 8 to about 22; wherein $x$ is a whole number from about 0 to 19 and $y$ is a whole number from about 0 to 19; wherein R is lower alkyl, lower alkenyl, cycloalkyl, heterocyclic, or aryl and A is an anion of an acid. These compounds are mixtures of substantially equal amounts of the various monoamine isomers wherein the monoamine is attached to a different internal carbon atom. Preferably, the linear paraffin chain contains from about 14 to 20 carbon atoms.

By "linear paraffin chain" is meant the straight chain of carbon atoms extending from one $CH_3$ terminal group to the other $CH_3$ terminal group in the above formula and does not include the branched amino group depending internally therefrom. In this respect, it is understood that the number of carbon atoms may, in certain instances, be less than 8 or greater than 22, the criterion being that the compound continue to act as an antistatic agent for the plastic, particularly polyethylene.

The lower alkyl radicals referred to above contain up to 8 carbon atoms and can be exemplified by radicals such as methyl, ethyl, propyl, isopropyl, and butyl.

The lower alkenyl radicals referred to above contain up to 8 carbon atoms and can be exemplified by radicals such as allyl, methallyl and crotyl.

The cycloalkyl radicals referred to above likewise contain up to 8 carbon atoms and can be exemplified by radicals such as cyclopropyl, cyclobutyl, cyclopentyl and cyclohexyl.

The heterocyclic radicals referred to above contain up to 10 carbon atoms.

The aryl radicals referred to above contain up to 14 carbon atoms and can be exemplified by radicals such as phenyl, benzyl, phenethyl, and naphthylmethyl.

The preferred radicals denoted by "R," above, are the lower alkyl and cycloalkyl radicals having up to 6 carbon atoms, the heterocyclic radicals having up to 8 carbon atoms and the aryl radicals having up to 8 carbon atoms including benzyl and phenethyl. The most preferred radicals are methyl and benzyl. The benzyl derivative has been found to be very effective as a germicide as well as being a superior antistatic agent for plastic.

The anion of the acid referred to above as "A" may be derived from a variety of inorganic and strong organic acids such as sulfuric, phosphoric, hydrohalic (hydrochloric, hydrobromic and hydroiodic), sulfamic, citric, lactic, maleic, malic, succinic, tartaric, cinnamic, acetic, benzoic, gluconic, ascorbic and related acids.

The isomeric mixtures of this invention may be formulated by various methods. Generally speaking, however, the isomeric mixtures are best formulated by first making an isomeric mixture of mononitrated paraffins and thereafter reacting this product with formaldehyde and hydrogen in the presence of a catalyst, such as nickel. The mono substituted dimethylamine derivatives formed by the foregoing procedure can then be quaternized in any suitable fashion, such as by reacting them with a quaternizing agent in a suitable solvent.

The basic mononitrated mixtures are conveniently produced by reacting a normal paraffin such as from about n-octane to n-docosane, and preferably from n-tetradecane to n-eicosane, with $N_2O_4$. The product of this reaction is found to be a mononitrated paraffin which is actually a substantially uniform mixture of each of the various mononitrated internal carbon atom isomers. The amount of each isomer present in the mixture is usually found to be approximately the same. In addition, the product is found to be substantially free of mononitrated terminal carbon atoms. It is believed that these characteristics of uniformly distributed isomers having no terminal groups, which characteristics are present in the final amine or derivatized amine product, each aid in providing the antistatic characteristics of the compounds of this invention.

This nitrated paraffin product having substantially no terminal nitro groups is then reduced to its dimethyl amine derivative by reacting the nitro groups with hydrogen and formaldehyde using a suitable reducing catalyst, such as nickel. The dimethyl amine groups so formed, like the nitro groups, are substantially uniformly distributed among the various isomeric internal carbon atoms. There being substantially no terminal amine groups. For example, in the reduction of mononitrated normal $C_{12}$ (dodecane, $C_{12}H_{26}$) paraffin, the isomeric dimethyl monoamine product mixture contains about 10 percent of the total dimethyl monoamine groups distributed among each of the internal carbon atoms with substantially no dimethyl amines on the terminal carbon atoms. That is to say, the product is a substantially uniform isomeric mixture of about 10 percent 2-carbon atom dimethyl monoamine, 10 percent 3-carbon atom dimethyl monoamine, and so forth up to the 11-carbon atom. Substantially no dimethyl amine groups are found on the 1 or 12 carbon atom.

The formation of these dimethyl monoamines may be represented by the following reaction equations:

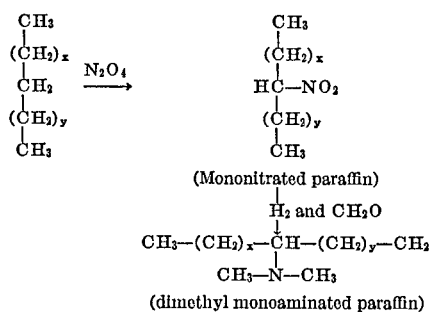

The quaternary ammonium salts of this invention represented by the formula:

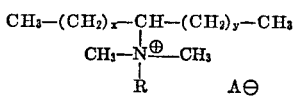

may be formed by reacting the above dimethyl monoaminated paraffin product with quaternizing agent using a suitable solvent. This product, like the intermediates described above is a mixture of the various monoamine isomers.

The quaternizing agents useful in forming the quaternary ammonium salts from the dimethyl monoaminated paraffin intermediates include a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluene sulfonate, ethylene chlorohydrin, propylene chlorohydrin, allyl bromide, methallyl bromide and crotyl bromide. The quaternizing reaction can be conducted in any suitable fashion known to those skilled in the art such as by heating the dimethyl monoaminated product with any of the above-mentioned quaternizing agents in a suitable solvent, e.g., an alcohol.

The compounds of this invention, as described above, when employed as antistatic agents are combined with plastics using techniques well known in the art. For example, one preferred technique according to this invention is to dissolve one or more of the above-listed antistatic agents in alcohol and add this solution to plastic pellets. The alcohol is then evaporated and the resulting pellets are for instance, milled on a two-roll heated mill to form plastic sheets having the antistatic agent incorporated therein. If sheets are not desired, other types of milling, extruding, fiber drawing or weaving, molding (blow or injection) etc. may be effected to form products other than sheets. When used as an external agent, as another example, the compounds of this invention in alcohol solution may be dipped, sprayed or wiped onto plastic products. Upon evaporation of the alcohol, a surface coating of the antistatic agent is provided.

The compounds of this invention when employed as antistatic agents are employed in amounts which are sufficient to suppress the electrostatic charges in the particular product being formed and thereby substantially reduce or eliminate the above-described problems. Governing the amount of agent necessary to effect this end will be many variables such as the type of plastic used, the type of treatment employed to form the plastic into a final product, and the end use to which the final product is put. Generally speaking, the problems arising from electrostatic charges are substantially eliminated if the antistatic agents of this invention are combined with the plastic in amounts of about 1.0 percent to about 0.05 percent and preferably from about 0.5 percent to about 0.1 percent by weight of said plastic.

The plastics contemplated for use in accordance with this invention include substantially all plastics in which the problem of electrostatic charges occurs. Examples of these plastics are the well-known synthetic resins and synthetic fibers. Of particular significance are the various polyamide or polycarbonamide synthetic fibers known as nylon and the polymers and copolymers comprised of the various monomers represented by the grouping:

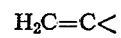

Examples of these polymers include polyvinyl chloride, polyvinylidene chloride, polystyrene, polymethylmethacrylate, polyethylene, and the like. These polymers and polyamides are of particular significance because of their great versatility in industry and their high propensity for accumulating electrostatic charges. They therefore, constitute a preferred group of plastics according to this invention. In this respect, a particularly preferred polymer for the purposes of this invention is polyethylene.

Polyethylene has found numerous uses in industry because of the relative ease with which it may be rolled, shredded, extruded, drawn, injection molded, or blow molded. Because of this extremely high versatility and because of this polymer's propensity for accumulating electrostatic charges, the antistatic agents of this invention are particularly useful when used therewith.

The above-described quaternary ammonium salt mixtures may be effectively used as external or internal agnts in a plastic to suppress electrostatic problems therein. Preferably the mixtures of this invention are used as internal agents by conventionally blending these agents into the final product. Most preferably the plastic used is nylon or polyethylene.

The following examples further illustrate the invention and are not intended as limitations thereon.

EXAMPLE 1

Formation of aminoalkane

A paraffin consisting of a mixture of $C_{14}$ to $C_{18}$ paraffins is nitrated using $N_2O_4$ gas and conventional vapor phase reaction techniques. As stated above, such a reaction results in substantially no terminal $NO_2$ groups being formed on the paraffin chain. The nitrated paraffin is then reacted by conventional hydrogenation techniques in suitable pressure hydrogenation apparatus with hydrogen, using a suitable hydrogenation catalyst (e.g. finely divided Ni), a solvent, and superatmospheric pressures. Generally the pressures used are about 600 p.s.i. to about 2000 p.s.i. and the temperatures used are between about 15° C. and 150° C. The product formed, is a substantially uniform mixture of $C_{14-18}$ paraffin monoamine isomers having substantially no terminal amine groups.

EXAMPLE 2

Five aminoalkanes, $C_{14}$, $C_{15}$, $C_{16}$, $C_{17}$ and $C_{18}$ were prepared in accordance with Example 1 and their isomer distribution measured and averaged. Measurement of the isomeric mixture of each individual alkane was conducted by converting to their cyclohexylimine derivatives and analyzing according to conventional gas chromatographic techniques with the following results shown in Table I after averaging all five compound measurements together.

TABLE I

| Amine isomer [1] (carbon atom No.): | percent isomer |
|---|---|
| 2 | 11 |
| 3 | 13 |
| 4 | 14 |
| 5 | 13 |
| 6, 7, 8 and 9 | 48 |

[1] No distinction is made between the 2 carbon atom and the 13 carbon atom for example in $C_{14}$ or the 14 carbon atom, as another example in $C_{15}$. Both isomers are listed together and are called the 2 carbon atom. The percent value, therefore, indicated to total percent of both symmetrical carbon atoms. The same is true with respect to the other symmetrical carbon atoms.

As can be seen from the table, the monoamine isomers are substantially uniform mixtures of the various amine isomers thereof.

The following table clearly illustrates that the isomeric mixtures of internal carbon atom monoamines, such as those prepared in Example 1, differ from the terminal amines of the prior art. This table of cloud point and pour point measurements illustrates the higher fluidity of the unsubstituted monoamines over conventional unsubstituted fatty acid amines having terminal amine groups.

TABLE II.—COMPARISON OF FLUIDITY OF AMINOALKANES AND FATTY AMINES

| Amine | Cloud point, °C. | Pour point, °C. |
|---|---|---|
| Aminoalkanes (total carbons in paraffin chain): | | |
| $C_{14}$ | −32 | −35 |
| $C_{14-18}$ | −17 | −20 |
| $C_{16}$ | −12 | −15 |
| $C_{20}$ | 16 | 13 |
| Fatty amines: | | |
| Coconut | 19 | 13 |
| Tallow | 63 | 46 |
| $C_{20}$ | | 65 |

EXAMPLE 3

Formation of acetate salt of aminoalkane $C_{14-18}$ Aminoalkane (31.6 g.—0.14 mole) was treated with a stoichiometric amount of glacial acetic acid (8.4 g.—0.14 mole). Cooling of the mixture in an ice bath was required. The amine acetate is a yellow liquid, and titration with a standard sodium hydroxide solution showed an equivalent weight of 284 g./mole (theory—286 g./mole).

EXAMPLE 4

Formation of hydrochloride salt of aminoalkane $C_{14-18}$ Aminoalkane (34.5 g.—0.15 mole) was dissolved in pentane (2–3 volumes) and anhydrous hydrogen chloride passed through the solution for 0.5 hour. The mixture was heated to remove pentane and excess hydrogen chloride. The amine hydrochloride was a yellow viscous oil which upon titration with a standard sodium hydroxide solution showed an equivalent weight of 272 g./mole (theory 262 g./mole).

EXAMPLE 5

Formation of dimethyl aminoalkanes

To the nitrated paraffin prepared in Example 1, there were added 37 percent aqueous formaldehyde, nickel (Girdler Catalyst 49B) and methanol and the resultant slurry was stirred in an autoclave at a temperature in the range of 40° to 90° C. and a hydrogen pressure of 500 p.s.i.g. for one hour. At the end of this period there was no longer absorption of hydrogen. The contents of the reactor were cooled to room temperature; the pressure released, and the catalyst removed therefrom by filtration. The methanol was stripped from the reaction mixture by heating at a temperature of 64° C. at atmospheric pressure and the residue was treated with water containing hydrochloric acid. The aqueous solution was extracted with ether and the amine released from its salt with sodium hydroxide. The dimethyl aminoalkanes were purified by distillation.

EXAMPLE 6

Formation of quaternary ammonium salts

A mixture of 144.5 g. (0.61 mole) of N,N-dimethylaminotetradecane formed in accordance with the process of Example 5, 15 g. of sodium bicarbonate, and 160 g. of 50 percent aqueous isopropanol was charged to a one-liter stirred autoclave. Methyl chloride (33 g., 0.66 mole) was then pressured into the autoclave. After 5.5 hours at 70° C., 99 percent of the amine was converted. The autoclave was cooled and then drained of product. The mixture was filtered to remove salts and the final product, a quaternary ammonium salt, namely trimethyltetradecyl quaternary ammonium chloride, was collected.

EXAMPLE 7

In order to illustrate the effectiveness of the isomeric mixtures of this invention as antistatic agents $C_{14}$, $C_{14}$–$C_{18}$, $C_{16}$ and $C_{20}$ monamine paraffins (substantial uniform isomeric mixtures thereof), their salts, and their quaternary ammonium derivatives were prepared using the procedures of the above examples. These agents were then compared for their ability to suppress electrostatic charges in polyethylene with several currently used antistatic agents as indicated by composition (e.g. N-$C_n$ etc.) and at times by trade name. The comparison was made by milling the antistatic agent into a low density polyethylene at 0.5 percent by weight polyethylene. The conductivity of the surface of a pressed specimen was determined at room temperature and 48 percent relative humidity with a Keithley No. 6105 Resistivity Adapter attached to 610 R Keithley Electrometer powered by a Keithley Model 240 High Voltage Supply. The values were converted to the logarithm of the surface resistivity. The results are as follows:

TABLE III.—SURFACE RESISTIVITIES OF POLYETHYLENE CONTAINING AMINE DERIVATIVES

| Antistatic agent (0.5 percent) | Log R (ohms/square at 73±2° F. and 48±2 percent R.H.)[a] | |
|---|---|---|
| | Initial | After 1 hour water immersion |
| None | >14 | |
| Amines: | | |
| $C_{14-18}$ aminoalkane* | 9.2 | 12.2 |
| $C_{20}$ aminoalkane* | 11.6 | 12.3 |
| $C_{14-18}$ aminoalkane, dimethyl* | 10.7 | 10.8 |
| Amine 100 (Richardson Co.) | 12.2 | |
| Coco amine, dimethyl (Armeen DMCD) | 9.6 | 10.1 |
| Tallow amine, dimethyl (Armeen DMHTD) | 12.0 | 12.1 |
| Salts: | | |
| $C_{14-18}$ aminoalkane acetate* | 11.0 | 11.2 |
| $C_{14-18}$ aminoalkane hydrochloride* | 10.3 | 12.1 |
| Quaternary ammonium chloride: | | |
| $C_{14}$ aminoalkane, trimethyl* | 9.5 | 10.5 |
| $C_{16}$ aminoalkane, trimethyl* | 9.6 | 11.6 |
| $C_{16}$ aminoalkane, dimethyl benzyl* | 10.1 | 11.6 |
| $C_{20}$ aminoalkane, trimethyl* | 10.4 | 13.3 |
| Stearamido propyldimethyl-β-hydroxyethyl ammonium nitrate (Catanac SN) | 10.6 | 13.4 |
| Tallow, trimethyl (Arquad T) | 8.9 | 13.8 |

[a] Values should be considered as follows: excellent (<10), good (10–11), fair (11–12) and poor (>12).
*Compounds according to this invention. For convenience they are referred to as aminoalkanes. In reality they are a uniform isomeric mixture as hereinabove described.

The results listed in this table are self-explanatory to one skilled in the art. All of the antistatic agents of this invention tested can be used as effective antistatic agents in polyethylene. In addition, the compounds of this invention prove more effective in lowering the resistivity than a well-known antistatic agent (Catanac SN) and ones derived from naturally occurring tallow. With the cationic quaternary ammonium chloride, the resistivity is increased after water immersion, which is probably due to the fact that the additive is leached out to some degree, but not to the degree of a tallow derivative.

EXAMPLE 8

In order to further illustrate the properties of the compounds of this invention the quaternary ammonium chlorides are compared with well-known antistatic agents using a typical nylon fabric which was immersed in 0.5, 0.2 and 0.1 percent solution of the agents and their resistivities measured in accordance with the procedure of Example 7 under normal conditions (50 percent relative humidity) and the more severe conditions of low humidity (about 25 percent). The results are listed as follows:

TABLE IV.—SURFACE RESISTIVITIES OF NYLON TREATED WITH AMINE DERIVATIVES

| | Log R (ohms/square at room temperature)[a] | | | | | |
|---|---|---|---|---|---|---|
| Additive in solution (percent) | 0.5 | | 0.2 | | 0.1 | |
| Relative humidity (percent) | 50 | 25 | 50 | 25 | 50 | 25 |
| Salts: $C_{14-18}$ aminoalkane hydrochloride* | 11.1 | 12.3 | 12.1 | 13.3 | 12.9 | 14.3 |
| Quaternary ammonium chlorides: | | | | | | |
| $C_{16}$ aminoalkane, trimethyl* | 8.4 | 11.2 | 9.1 | 11.7 | 10.2 | 12.7 |
| $C_{16}$ aminoalkane, benzyldimethyl* | 9.9 | 12.0 | 10.9 | 12.9 | 11.6 | 13.3 |
| Coco, trimethyl (Arquad C-50) | 8.1 | 10.3 | 9.7 | 11.9 | 10.5 | 12.9 |
| Tallow, trimethyl (Arquad T-50) | 8.4 | 10.8 | 8.9 | 11.2 | 10.2 | 13.0 |
| Diisobutyl phenoxyl ethoxyl ethyl dimethylbenzyl ammonium chloride (Hyamine 1622) | 13.3 | 15.6 | 11.0 | 14.1 | 11.5 | 14.2 |
| Stearamido propyldimethyl-β-hydroxyethyl ammonium nitrate (Catanac SN) | 9.1 | 11.2 | 10.1 | 12.4 | 10.9 | 13.3 |
| Methyl diethyloxyl coco ammonium chloride (Arquad C/12) | | | 10.3 | | 11.6 | 12.6 |

[a] Values should be considered as follows: excellent (<10), good (10–11), fair (11–12) and poor (>12).
*Compounds according to this invention.

As it can be observed from the table, the quaternary ammonium salts of this invention exhibited the best suppressing capabilities. Effectiveness naturally decreases with decreasing concentration and also with a reduction in humidity. Trimethyl $C_{16}$ alkane ammonium chloride was better than its benzyldimethyl analogue, and about comparable to other quaternaries from fatty amines.

Many modifications, variations, and other features of this invention will become apparent to the skilled artisan once given the above disclosure. Such modifications, variations, and other features are therefore considered a part of this invention, the scope of which is to be determined by the following appended claims.

We claim:
1. A mixture of quaternized amine isomers of an aminoalkane represented by the formula:

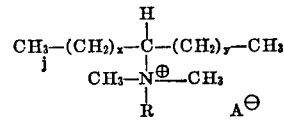

wherein the total number of carbons in the linear paraffin chain is from about 8 to about 22;
wherein $x$ is a whole number from about 0 to 19 and $y$ is a whole number from about 0 to 19;
wherein R is a lower alkyl having up to 8 carbon atoms;
wherein A is an anion of an acid selected from the group consisting of sulfuric, phosphoric, hydrohalic, sulfamic, citric, lactic, maleic, malic, succinic, tartaric, cinnamic, acetic, benzoic, gluconic and ascorbic acids; and
wherein said quaternary ammonium groups are substantially uniformly distributed among all of the internal carbon atoms of said mixtures of isomers.

2. A mixture according to claim 1 wherein the sum of $x+y$ is 11.

References Cited
UNITED STATES PATENTS
3,385,893   5/1968   Wakeman _____ 260—567.6 R
3,371,118   2/1968   Lundeen et al. _____ 260—583

LEON ZITVER, Primary Examiner

M. W. GLYNN, Assistant Examiner

U.S. Cl. X.R.

260—78 S, 89.5, 92.8, 93.5 A, 94.9 GD, 501.15, 567.6 M, 999, Dig. 20